United States Patent Office  
3,781,345  
Patented Dec. 25, 1973

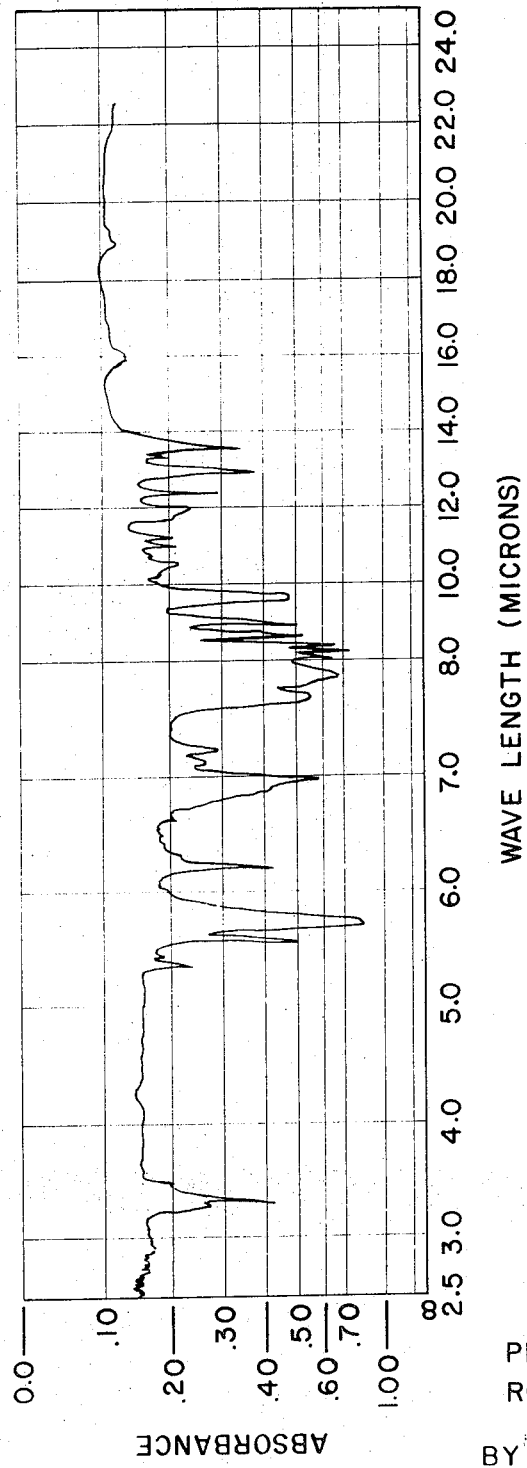

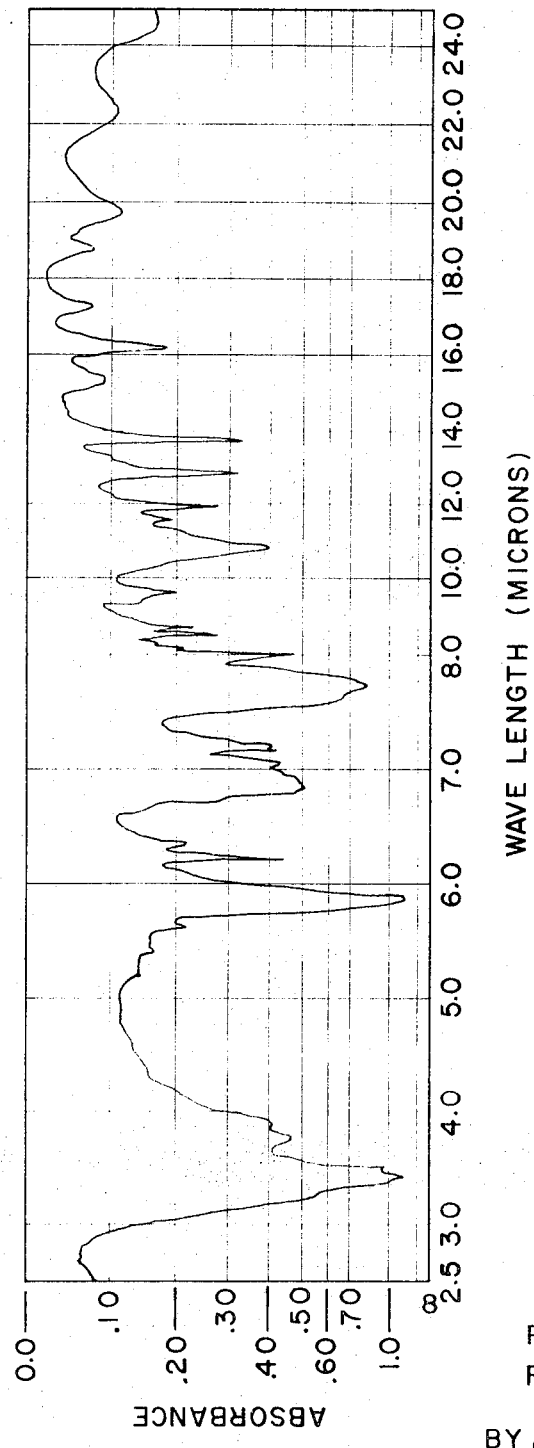

3,781,345
METHOD OF PREPARING 2,4-DIMETHYL-ISOPHTHALIC ACID
Philmore M. Scudder, Havertown, Pa., and Robert W. Warren, Pitman, N.J., assignors to Sun Research and Development Co., Philadelphia, Pa.
Filed Feb. 24, 1971, Ser. No. 118,376
Int. Cl. C07c 63/02, 63/14
U.S. Cl. 260—524 R    1 Claim

ABSTRACT OF THE DISCLOSURE 2,4-dimethylisophthalic acid, its esters and a process for preparing the acid by partial oxidation of prehnitene with aqueous permanganate.

---

It is known in the literature to oxidize various polyalkyl benzenes to the corresponding carboxylic acids, but heretofore 2,4-dimethylisophthalic acid of structure

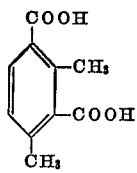

has not been obtained. In U.S. 3,467,698 (Schulz et al., issued Sept. 16, 1969) the oxidation of various alkyl aromatic compounds with molecular oxygen, a transition metal salt catalyst, and a cyclohexane is disclosed. Prehnitene is disclosed as a starting material, but the method of the patent yields the tetra-carboxylic acid, prehnitic acid. Likewise, U.S. 3,119,860 (Kalfadelis et al., issued Jan. 28, 1964) describes the oxidation of 1,2,3,4-tetramethylbenzene with an oxygen containing gas catalyst and a bromine material to yield prehnitic acid. Similarly, U.S. 2,966,514 (Benning et al., issued Dec. 27, 1960) discloses the oxidation of chloromethylated xylenes to 1,2,3,4-benzene-tetra-carboxylic-acid.

The disclosure of U.S. 3,008,983 (Ardis et al., issued Nov. 14, 1961) is also of interest. This patent deals with the preparation of methylaromatic dicarboxylic acids by a liquid phase catalytic oxidation of tri- and tetra-methylbenzenes. The patent illustrates the oxidation of durene to 2,5-dimethylterephthalic acid and 4,6-dimethylisophthalic acid which is shown to have the structure

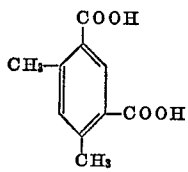

At Example 7 of this patent, durene is oxidized to yield 33% of 2,5-dimethyl terephthalic acid and 67% of a compound said to be 2,4-dimethylisophthalic acid. It is obvious, however, that the 2,4-dimethylisophthalic acid referred to here was erroneously named and is really 4,6-dimethylisophthalic acid. This is clear from the fact that at the bottom of column 1 and at the top of column 2 of the patent, the specific oxidation reaction for durene is set forth and the 4,6-dimethylisophthalic acid is shown as a product and furthermore, durene cannot give the 2,4-isomer because of the characteristic placement of its methyl groups.

Accordingly, this invention provides the novel compound 2,4-dimethylisophthalic acid and its lower alkyl esters of structure

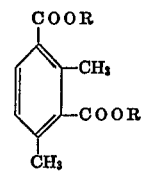

where R is H or lower alkyl. Preparation of the acid is accomplished by oxidation of prehnitene (1,2,3,4-tetramethylbenzene) with an aqueous permanganate solution. In view of the art discussed above showing the oxidation of prehnitene to the tetra-carboxylic acid, it is surprising that the dicarboxylic acid is obtained. The 2,4-dimethylisophthalic acid compound obtained in accordance with the invention is useful as an intermediate for the preparation of polyester materials which can be formed and shaped into useful plastics and fibers and the compound has further utility in that it is a suitable reactant for the formation of alkyd resins. Furthermore, it may be used in place of phthalic acid in many applications.

The esters of 2,4-dimethylphthalic acid are readily prepared by known esterification techniques (e.g. with sulfuric acid as catalyst) using preferably a lower alkanol; e.g., methanol, ethanol, propanol, and the various isomeric butanols, pentanols and hexanols. These esters are of value as plasticizers and as paint solvents.

In accord with the process of the invention, prehnitene is added to an aqueous permanganate solution, preferably potassium permanganate, and heated usually at reflux for several hours, one to four hours being generally sufficient. After cooling the reaction mass, it is extracted with ether to recover any unreacted prehnitene, and the manganese dioxide formed during the reaction is then filtered off and the mixture acidified with a mineral acid such as hydrochloric. The acid reaction mass is then extracted with ether and the ether extract evaporated to obtain a crude 2,4-dimethylisophthalic acid product mixture. To obtain the esters the crude acid mixture may be esterified with an alkanol and the ester separated by gas chromatography. Saponification of the ester yields the acid product. The acid product may be purified by extraction with acetone or other organic solvents.

2,4-dimethylisophthalic acid is a white solid material melting at 229° to 231° C. Unlike phthalic acid, which sublimes to form its anhydride, 2,4-dimethylisophthalic acid is not a sublimable solid.

In order to further illustrate the invention, the following example is given:

EXAMPLE 94 grams of potassium permanganate in 3.5 liters of water was reacted with 20 grams of prehnitene. The potassium permanganate solution was placed in a three-necked round bottom flask equipped with a reflux condenser and a mechanical stirrer. Then, all the prehnitene was added with stirring at room temperature and the reaction mass was heated to reflux temperature for four hours. On cooling the reaction mixture it was extracted with 200 ml. of ether to recover any unreacted prehnitene. The manganese dioxide by-product was filtered off and the reaction mixture was acidified with hydrochloric acid to a pH of 2. The acidified reaction mixture was extracted with 200 ml. of ether and 7.0 grams of a white, powdery organic solid (crude 2,4-dimethylisophthalic acid) was obtained upon evaporation of the ether.

The white solid product was esterified with absolute methyl alcohol and sulfuric acid. The dimethyl ester so obtained was isolated by gas chromatography and its structure confirmed by infrared spectrographic analysis. The dimethyl ester of 2,4-dimethylisophthalic acid is a liquid and characterized by the infrared absorption spectra shown in FIG. 1. Nuclear magnetic resonance studies of the ester indicates 1,3-substitution. Hydrolysis of the ester to 2,4-dimethylisophthalic acid is accomplished by reflux with a 10% alcoholic sodium hydroxide solution. Dilution with water, extraction with ether, and evaporation of ether yields the acid which has the infrared absorption curve shown in FIG. 2.

What is claimed is:

1. A process for preparing 2,4-dimethylisophthalic acid which comprises oxidizing prehnitene by refluxing with aqueous permanganate for one to four hours.

References Cited

UNITED STATES PATENTS

| | | | |
|---|---|---|---|
| 2,509,855 | 5/1950 | Beach | 260—524 R |
| 3,008,983 | 11/1961 | Ardis et al. | 260—524 |

OTHER REFERENCES

Yamaguchi, Bull. Chem. Soc. Japan, 31, 51–55 (1958).

LORRAINE A. WEINBERGER, Primary Examiner

E. J. SKELLY, Assistant Examiner

U.S. Cl. X.R.

260—475 R, 515 P